United States Patent [19]

Harris et al.

[11] Patent Number: 5,115,070

[45] Date of Patent: May 19, 1992

[54] POLYALKYENEOXY POLYAHLS CONTAINING HYDROGEN BONDING MOIETIES IN THEIR BACKBONE AND HYDROXYALKYL CARBAMATE END GROUPS AND A PROCESS FOR THEIR PREPARATION

[75] Inventors: Robert F. Harris; Michael D. Joseph, both of Midland, Mich.

[73] Assignee: The Dow Chemical Company, Midland, Mich.

[21] Appl. No.: 491,376

[22] Filed: Mar. 9, 1990

[51] Int. Cl.⁵ .................. C08G 18/00; C08G 71/00
[52] U.S. Cl. ........................... 528/59; 528/44; 528/58; 528/196; 564/59; 564/61
[58] Field of Search ............... 528/44, 196, 595 G, 528/58; 564/59, 61

[56] References Cited

U.S. PATENT DOCUMENTS

| | | | |
|---|---|---|---|
| 3,248,424 | 4/1966 | Muller et al. | 564/48 |
| 3,471,449 | 10/1969 | Naydkamp et al. | 528/69 |
| 3,475,377 | 10/1969 | Rosendahl et al. | 528/60 |
| 3,583,937 | 6/1971 | Damusis | 524/443.17 |
| 3,591,560 | 7/1971 | Wagner et al. | 528/48 |
| 4,002,598 | 1/1977 | Waddill et al. | 528/110 |
| 4,115,360 | 9/1978 | Schulze et al. | 528/94 |
| 4,116,938 | 9/1978 | Schulze et al. | 528/93 |
| 4,122,068 | 10/1978 | Meyer | 528/93 |
| 4,122,069 | 10/1978 | Meyer | 528/93 |
| 4,141,885 | 2/1979 | Waddill | 528/93 |
| 4,146,701 | 3/1979 | Waddill et al. | 528/91 |
| 4,178,427 | 12/1979 | Waddill et al. | 528/124 |
| 4,340,712 | 7/1982 | Reichmann et al. | 528/45 |
| 4,356,275 | 10/1982 | Wagner et al. | 521/136 |
| 4,418,160 | 11/1983 | Rasshofer et al. | 521/159 |
| 4,484,994 | 11/1984 | Jacobs, III et al. | 528/73 |
| 4,525,590 | 6/1985 | Rasshofer et al. | 544/222 |
| 4,704,446 | 11/1987 | Goel | 528/78 |
| 4,800,058 | 1/1989 | Younes | 528/53 |
| 4,959,499 | 9/1990 | Harris | 564/59 |
| 5,055,544 | 10/1991 | Harris et al. | 528/59 |

FOREIGN PATENT DOCUMENTS 0280815 9/1988 European Pat. Off. .
52-59632 5/1977 Japan .

OTHER PUBLICATIONS

EPO Patent Application Ser. No. 240,196.
EPO Patent Application Ser. No. 242,974.

*Primary Examiner*—John Kight, III
*Assistant Examiner*—Duc Truong

[57] ABSTRACT

A polyahl comprising a backbone having at least one acyclic moiety selected from the group consisting of urea, biuret, thiourea, dithiobiuret, amide, and thioamide; and at least two polyalkyleneoxy moieties; and at least one terminal hydroxyalkyl carbamate group is disclosed. These polyahls may be prepared by contacting a modified polyamide compound containing in its backbone at least one acyclic moiety selected from the group consisting of urea, biuret, thiourea, dithiobiuret, amide, and thioamide wherein the amino groups are sufficiently spaced apart from each other that they do not undergo reaction with a single alkylene carbonate moiety to form a cyclic urea moiety, with a cyclic alkylene carbonate, in amounts thereof and under conditions effective to form the polyahl. Prepolymers and polymers prepared from such polyahls are also disclosed.

20 Claims, No Drawings

POLYALKYENEOXY POLYAHLS CONTAINING HYDROGEN BONDING MOIETIES IN THEIR BACKBONE AND HYDROXYALKYL CARBAMATE END GROUPS AND A PROCESS FOR THEIR PREPARATION

CROSS REFERENCE TO RELATED APPLICATIONS

This application is related to copending U.S. applications Ser. No. 247,460, filed Sep. 21, 1988, now U.S. Pat. No. 4,916,201, issued Apr. 10, 1990, which is a continuation-in-part of Ser. No. 099,027, filed Sep. 21, 1987, abandoned; Ser. No. 926,692, filed Nov. 4, 1986, abandoned; Ser. No. 000,227, filed Jan. 2, 1987, now U.S. Pat. No. 4,959,499, issued Sep. 25, 1990; U.S. Pat. No. 4,689,353, U.S. application Ser. No. 254,503, filed Oct. 6, 1988, Ser. No. 310,107, filed Feb. 10, 1989, and Ser. No. 485,678 filed Feb. 28, 1990, by the same inventor.

FIELD OF THE INVENTION

This invention relates to polyalkyleneoxy polyahls and to methods for their preparation.

BACKGROUND OF THE INVENTION

Polyamines are known to react with alkylene carbonates to form 2-hydroxyalkyl carbamates. This reaction occurs by merely heating the two reactants at 100° C. (See, for example, U.S. Pat. Nos. 4,122,068; 4,122,069; 4,484,994; and EPO application 0,280,815).

Products containing amino terminal groups and polyether and urea moieties in their backbone have long been known. One method for preparing amino-terminal polyethers having urea groups involves the following reactions of urea with diamines

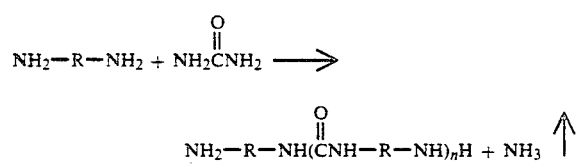

wherein R is a polyether diradical (U.S. Pat. Nos. 4,002,598; 4,115,360: 4,116,938: 4,178,427 and DE 2,748,705). Such materials have been used in combination with aldehydes as epoxy curing agents.

By slightly changing the stoichiometry of the reactants, products have been made containing urea end groups and polyether and urea groups in their backbone such as

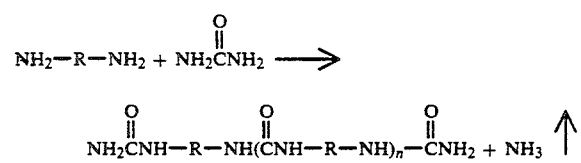

(U.S. Pat. Nos. 4,141,855 and 4,356,275). Such products have been used in combination with aldehydes as epoxy curing agents.

A second known method of producing amino-terminal polyethers containing urea moieties in their backbone involves the reaction of polyether polyamines with diphenyl carbonate with the removal of phenol as follows:

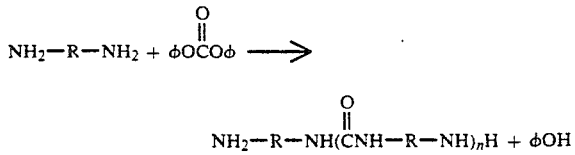

(U.S. Pat. Nos. 4,002,598; 4,115,360; and 4,178,427; N. Yamazaki and S. Nakahams, "Polymer Preprints", ACS, Div. Polym. Chem., 20:146 (1979)).

Yet another process has been described for making products of the same general structure by reacting polyether polyamines with phosgene in the following manner (U.S. Pat. Nos. 4,002,598: 4,115,360 and 4,178,427)

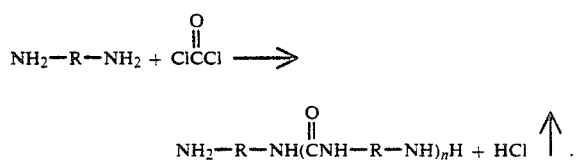

These products have also been used as epoxy curing agents.

Products related thereto have also been made by reacting amino alcohols with phosgene (C. Giori, "Polymer Preprints", Acs, Div. Polym. Chem., 11:326 ((1970)).

Still another process for making materials of this type has been reported involving the reaction of polyamines with carbon dioxide in the presence of diphenyl phosphite and pyridine. This process is believed to occur according to the following chemical reaction.

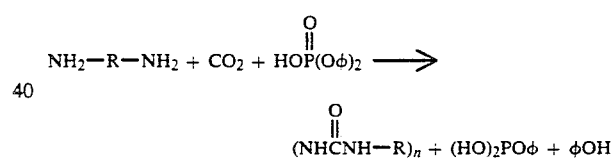

Yamazaki, F. Higashi and T. Iguchi, Tetrahedron Letters, 1191 (1974); N. Yamazaki, F. Higashi and T. Iguchi, Tetrahedron, 31:3031 (1975); N. Yamazaki, F. Higashi and T. Iguchi, J. Polym. Sci., Polym. Lett. Ed., 12:517 (1974); and N. Yamazaki, F. Higashi and T. Iguchi, Polym. Ed., 13:785 (1975)).

Polymers have been prepared by reacting alkylene carbonates with hexamethylenediamine at high temperatures. (G. Cameresi, S. Fumasoni, M. Palazzo and F. Pochetti, Ann. Chim. (Rome), 57:927 (1967)). However, the solid polymers prepared by this process are not suitable for use in reaction injection molding processes.

Secondary amines have been reacted with ethylene carbonate to form the corresponding 2-hydroxyethyl carbamate, followed by reaction with alkylene oxides to form the corresponding poly(alkyleneoxy) derivatives (U.S. Pat. No. 4,111,920). Hydroxyalkyl carbamates have been used with epoxy resins for cathodic electrodeposition (U.S. Pat. No. 4,484,994).

Aminated poly(alkylene glycols) have been reacted with alkylene carbonates to produce polyether dicarbamates useful as components in epoxy resins (U.S. Pat. Nos. 4,122,068 and 4,122,069). Materials of this type have been used as polyols and reacted with polyisocyanates to form cellular and non-cellular polyurethanes (U.S. Pat. No. 4,704,446).

SUMMARY OF THE INVENTION

In one aspect, this invention is a novel polyahl comprising
(1) a backbone having:
  (a) at least one acyclic moiety selected from the group consisting of urea, biuret, thiourea, dithiobiuret, amide, and thioamide; and
  (b) at least two polyalkyleneoxy moieties; and
(2) at least one terminal hydroxyalkyl carbamate group.

In a second aspect, this invention is a process for preparing polyahls containing hydroxyalkyl carbamate moieties which comprises reacting
(A) a modified polyamine compound containing in its backbone at least one acyclic moiety selected from the group consisting of urea, biuret, thiourea, dithiobiuret, amide, and thioamide wherein the amino groups are sufficiently spaced apart from each other that they do not undergo reaction with a single alkylene carbonate moiety to form a cyolic urea moiety, with
(B) a cyclic alkylene carbonate, in amounts thereof and under conditions effective to form a hydroxyalkyl carbamate-containing polyahl comprising
  (1) a backbone having;
    (a) at least one acyclic moiety selected from the group consisting of urea, biuret, thiourea, dithiobiuret, amide, and thioamide; and
    (b) at least two polyalkyleneoxy moieties; and
  (2) at least one terminal hydroxyalkyl carbamate group.

In a third aspect, this invention is an isocyanate-functional prepolymer which comprises the reaction product of the polyahls of the invention with an excess over stoichiometry of polyisocyanates.

In a fourth aspect, this invention is a urethane/urea polymer formed by the reaction of the above-mentioned isocyanate-functional prepolymers with polyahls.

In a fifth aspect, this invention is a urethane/urea polymer formed by the reaction of the polyahls of the invention with polyisocyanates, optionally in the presence of other polyahls.

There are many advantages to the polyahls of the instant invention over the polyahls of the prior art. By converting some or all of the amino end groups on the polyamine starting material to hydroxyalkyl carbamate end groups, the subsequent reactivity toward polyisocyanates is reduced to a more controllable rate. For example, while aliphatic, primary amines can be processed with polyisocyanates by reaction injection molding (RIM) fabrication, they are too reactive to be fabricated by flexible foam or hand cast technology. The novel polyahls of this invention have a slower reactivity towards isocyanates, enabling the use of such processing methods. At the same time, they provide the desirable properties. Physical property enhancement can include increased modulus, strength, hardness, solvent resistance, and reduced coefficients of linear thermal expansion.

The end group formed by this process is a 2-hydroxyalkyl carbamate. The introduction of acyclic carbamate moieties into the backbone of polyahls with hydroxyl and/or amino end groups allows adjustment of the physical and chemical properties of these polyahls to maximize their effectiveness in specific applications. For example, the polyahls of this invention are useful for producing materials for applications in flexible urethane foams, urethane coatings, rigid urethane foams, urethane/urea elastomers and plastics, adhesives, functional fluids, polymeric coatings and surfactants among others. Such polyahls are also useful in the production of polyesters and epoxy resins.

DETAILED DESCRIPTION OF THE INVENTION

In its first aspect, this invention is a novel polyahl comprising
(1) a backbone having:
  (a) at least one acyclic moiety selected from the group consisting of urea, biuret, thiourea, dithiobiuret, amide, and thioamide: and
  (b) at least two polyalkyleneoxy moieties; and
(2) at least one terminal hydroxyalkyl carbamate group.

Preferably, each terminal hydroxyalkyl carbamate group independently has the following structure

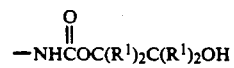

wherein $R^1$ is hydrogen, a $C_{1-6}$ alkyl, or an inertly-substituted $C_{1-6}$ alkyl, and is preferably hydrogen, methyl, or ethyl, and is most preferably hydrogen or methyl. Difunctional polyahls are preferred, although higher functional polyahls are useful when a more cross-linkable material is desired. Most preferably, the polyahl contains from two to four terminal hydroxyalkyl carbamate groups. The novel polyahls of this invention have a controllably reduced reactivity over polyahls containing only amine functionalities. This is an advantage in many applications where the reaction rate of aliphatic polyamines with isocyanates is too rapid.

In a second aspect, this invention is a novel process for preparing polyahls containing hydroxyalkyl carbamate moieties which comprises reacting
(A) a modified polyamine compound containing in its backbone at least one acyclic moiety selected from the group consisting of urea, biuret, thiourea, dithiobiuret, amide, and thioamide, wherein the amino groups are sufficiently spaced apart from each other that they do not undergo reaction with a single alkylene carbonate moiety to form a cyclic urea moiety, with
(B) a cyclic alkylene carbonate, in amounts thereof and under conditions effective to form a hydroxyalkyl carbamate-containing polyahl comprising
  (1) a backbone having:
    (a) at least one acyclic moiety selected from the group consisting of urea, biuret, thiourea, dithiobiuret, amide, and thioamide: and
    (b) at least two polyalkyleneoxy moieties; and
  (2) at least one terminal hydroxyalkyl carbamate group.

The modified polyamines which contain in their backbone at least one acyclic moiety selected from the group consisting of urea, thiourea, biuret, dithiobiuret, amide, and thioamide are generally represented by the formula:

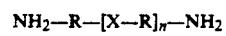

I wherein each R is independently in each occurrence an alkylene, cycloalkylene, aralkylene, aryl, alkyleneoxy, or polyalkyleneoxy moiety, wherein at least one R is polyalkyleneoxy; X is independently in each occurrence an acyclic moiety selected from the group consisting of urea, biuret, thiourea, dithiobiuret, amide, and thioamide: when X is a urea moiety, X is of the following formula:

—NHCNH—,

X is a biuret moiety, X is of the following formula:

—NHCNHCNH—, when X is a thiourea moiety X is of the following formula:

—NHCNH—, when X is a dithiobiuret moiety X is of the following formula:

—NHCNHCNH—, when X is an amide moiety X is of the following formula:

—NHC(R')CNH—, where R' is alkylene, cycloalkylene, aralkylene, arylene, and when X is a thioamide moiety X is of the following formula:

—NHC(R')CNH—;

and n is an integer between 1 and 50, and preferably between 2 and 50. These modified polyamines may be prepared by contacting a polyalkyleneoxy polyamine with urea, thiourea, biuret, dithiobiuret, a polycarboxylic acid, or a polythiocarboxylic acid, or a combination thereof, optionally in the presence of a primary or secondary polyamine such as a $C_{4-20}$ alkylene-, cycloalkylene-, aralkylene-, or arylenepolyamine. This process is fully described in copending applications Ser. No. 247,460, filed Sep. 21, 1988, now U.S. Pat. No. 4,916,201 issued Apr. 10, 1995, 254,503, filed Oct. 6, 1988; and Ser. No. 485,678 filed Feb. 28, 1990, now U.S. Pat. No. 5,055,544 issued Oct. 8, 1991, entitled "AMINO-FUNCTIONAL POLYETHERS CONTAINING UREA, BIURET, THIOUREA, DITHIO- BIURET, THIOAMIDE, AND/OR AMIDE MOIETIES IN THEIR BACKBONE AND URETHANE/UREA PREPOLYMERS AND POLYMERS MADE THEREFROM, Robert F. Harris et al., which are hereby incorporated by reference in their entirety.

Any primary or secondary polyamine can be used to make these modified polyamine compounds as long as it contains a plurality of amino-functional groups which are bonded to carbons that are sufficiently spaced apart to preclude the formation of cyclic urea or cyclic urethane moieties when the polyamine is reacted with a cyclic carbonate. When the polyamine compounds are aliphatic, the amino groups are preferably spaced apart from each other by a chain of at least 4 carbon atoms. Preferably, this polyamine is a $C_{4-20}$ alkylene-, cycloalkylene-, aralkylene-, or arylene polyamine.

Aliphatic diamines are a preferred class of polyamines, with polyalkyleneoxy polyamines as the most preferred. Examples of additional types of aliphatic polyamines suitable for use in this invention include tetramethylenediamine, pentamethylenediamine, hexamethylene diamine, 1,12-diamino dodecane, and 1,18-diaminooctadecane. octadecane. Aliphatic diamines can contain other moieties in their backbone such as oxygen, sulfur, and nitrogen. Examples of such materials include N,N'-bis(3-aminopropyl)ethylenediamine, N,N'-bis(3-aminopropyl)piperazine, diethylenetriamine, triethylenetetramine, N,N'-bis(2-aminoethyl)piperazine, and 1,8-diamino-p-methane.

Aromatic polyamines are also useful to make the starting materials of this invention. Examples include 2,4-toluenediamine, 2,6-toluenediamine, 2,4,6-toluenetriamine, 1,4-benzenediamine and 4,4'-methylenedianiline. When the polyamine compounds are aromatic, the amino groups are preferably spaced apart from each other in a meta or para arrangement on the same aromatic ring or by at least 4 carbons when the amino groups are on different aromatic rings.

A mixture of two or more polyamino compounds can be suitably used. When operating the process in this way, a product is obtained with a mixed backbone structure which may be advantageous in some cases.

Polyalkyleneoxy polyamines are well-known compositions which are conventionally prepared by the reductive amination of polyether polyols using hydrogen and ammonia in the presence of catalyst. This reductive amination of polyols is described in U.S. Pat. Nos. 3,128,311; 3,152,998; 3,236,895; 3,347,926; 3,654,370; 4,014,933 and 4,153,581, the relevant portions of which are herein incorporated by reference. Most preferred are polyalkyleneoxy polyamines with a molecular weight of from about 200 to about 6000. Such polyalkyleneoxy polyamines based on 1,2-alkylene oxides are represented by the formula:

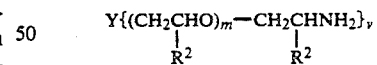

$$Y\{(CH_2CHO)_m-CH_2CHNH_2\}_v \qquad \text{II}$$
$$\phantom{Y\{(CH_2CH}|\phantom{O)_m-CH_2CH}|$$
$$\phantom{Y\{(CH_2CH}R^2\phantom{O)_m-CH_2CH}R^2$$

wherein Y is the residue of a v-valent polyahl which is susceptible to oxyalkylation and which contains from 2 to 24 carbon atoms and 3 to 10 terminal active hydrogen moieties, and is preferably hydroxy, amino, mercapto, or carboxylic acid: m is a whole number 1 to 100; v is a whole number from 2 to 8, preferably from 2 to 3; and $R^3$ is hydrogen or alkyl having from 1 to 24 carbon atoms, which alkyl can be substituted with moieties that are inert to the oxyalkylation conditions. Alternatively, the polyalkyleneoxy polyamine can be based on polymethylene glycol and represented by the formula:

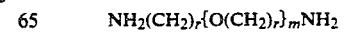

$$NH_2(CH_2)_r\{O(CH_2)_r\}_mNH_2 \qquad \text{III}$$

wherein m is as defined hereinbefore and r is an integer from 3 to 10, preferably 4, 6 or 8.

Polyalkyleneoxy polyamines having 3-aminopropoxy end groups are also well-known compositions which can be used in this invention to prepare the modified polyamine compounds. Such polyamines can be obtained by the cyanoethylation of polyols with acrylonitrile followed by hydrogenation to the corresponding polyamines. The synthesis of materials of this type is described in Rylander, *Catalytic Hydrogenation in Organic Synthesis* (1979) and in U.S. Pat. Nos. 3,471,563; 3,880,928; 3,880,929; 3,896,174, the relevant portions of which are herein incorporated by reference. Such polyalkyleneoxy polyamines based on 1,2-alkylene oxides are represented by the formula:

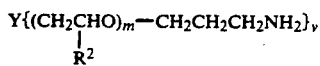

IV wherein Y, m, $R^2$ and v are as defined hereinbefore.

The spacial arrangement between the amino groups is important in order for the desired acyclic urea moieties to be formed. It is important for the amino end groups to react intermolecularly with the cyclic alkylene carbonate. If the distance between the amino end groups is less than 4 carbon atoms for an aliphatic polyamine or if the amino end groups are in an ortho arrangement in an aromatic ring, then two amino end groups can react with the same cyclic alkylene carbonate residue to form a cyclic urea moiety that does not react further. Under these circumstances the desired products are not usually formed.

When a diamine containing in its backbone at least one acyclic moiety selected from the group consisting of urea, thiourea, biuret, dithiobiuret, amide, and thioamide, is used as a starting material, and the cyclic alkylene carbonate reacts with only one of the amine moieties, the preferred polyahl structure is as follows:

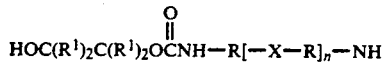

V wherein R, $R^1$, X, and n are as defined above. Preferably, the polyahl contains at least one polyalkyleneoxy moiety. Most preferably, R is a polypropyleneoxy moiety.

When a diamine containing in its backbone at least one acyclic moiety selected from the group consisting of urea, thiourea, biuret, dithiobiuret, amide, and thioamide, is used as the starting material and both amine moieties react with the cyclic alkylene carbonate, the preferred polyahl structure is as follows:

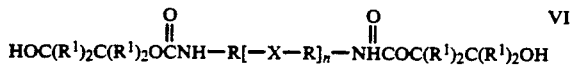

VI wherein R, $R^1$, X, and n are as defined above. Preferably, the polyahl contains at least one polyalkyleneoxy moiety. Most preferably, R is a polypropyleneoxy moiety.

The cyclic alkylene carbonates useful to make the novel compositions of this invention are typically five-membered cyclic carbonates such as those derived from 1,2-glycols or from 1,2-epoxides and carbon dioxide. Examples of cyclic alkylene carbonates include ethylene carbonate, propylene carbonate, 1,2-butylene carbonate, 2,3-butylene carbonate and vinyl ethylene carbonate. These cyclic alkylene carbonates can be represented structurally as

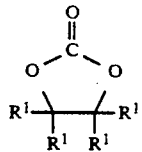

VII where each $R^1$ is independently hydrogen, methyl, ethyl or vinyl. Cyclic carbonates which contain six-membered cyclic rings can also be used. Mixtures of cyclic alkylene carbonates can be used.

Ethylene carbonate and propylene carbonate are the most preferred cyclic alkylene carbonates for use in the processes of the invention, and to make the novel compositions of this invention.

The process of this invention is carried out by contacting polyamines containing in their backbone at least one acyclic moiety selected from the group consisting of urea, thiourea, biuret, dithiobiuret, amide, and thioamide, compounds and cyclic alkylene carbonates under conditions suitable to form the desired polyahl product. This process can be carried out either neat or in an inert solvent, and is preferably carried out neat.

When the process is carried out neat or in an inert solvent, the molar ratio of cyclic alkylene carbonate to diamino compound is preferably in the range between about 0.1:1 and 10:1, more preferably in the range between about 0.5:1 and 8:1, and still more preferably in the range between about 1:1 and 5:1. As the cyclic alkylene carbonate:polyamine molar ratio is increased, a larger proportion of hydroxyalkyl carbamate moieties are present as end groups on the product. At the higher ratios, some cyclic carbonate starting material can also be present.

When the process is carried out neat or in an inert solvent, the process is preferably conducted at a pressure above about 200 mm, more preferably above about 500 mm, and preferably below about 5 atm, more preferably below about 2 atm. Most preferably, the process is conducted at about atmospheric pressure.

The reactants are preferably reacted under reaction conditions whereby the reaction to form hydroxyalkyl carbamate moieties is maximized. This is conveniently done neat at about 100° C. to 150° C. at about atmospheric pressure with good agitation. The reaction is generally allowed to proceed for a time period in the range of about 2 hours to about 10 hours, depending on the reactants, temperatures, catalyst type and catalyst concentration which is desired. More commonly, the reaction will proceed for a time period in the range from about 2 hours to about 8 hours.

The course of the reaction can be followed by periodic removal of samples from the reactor, followed by measurement of decrease in the free amine content. Carbon-13 NMR is also useful for following the course of the reaction.

If a solvent is used, the removal of the solvent to obtain the polymeric product may be accomplished by distillation at either atmospheric or reduced pressures. In general, the last traces of solvent are removed at reduced pressures when higher boiling solvents are used. The temperature must be held below the product decomposition temperature during solvent removal. Higher temperatures can be used for solvent removal if a catalyst is not present since the product decomposition temperature is increased. A falling film still is particularly well suited for removal of higher boiling solvents since the contact time at high temperatures is reduced to a minimum. It is preferable to use a volatile solvent when a solvent is used so that it can be easily removed from the product. It is most preferred to carry out the process neat.

Thus, the reactions of the process of this invention to form hydroxyalkyl carbamate moieties can be schematically represented as follows for a diamine containing in its backbone at least one acyclic moiety selected from the group consisting of urea, thiourea, biuret, dithiobiuret, amine, and thioamide:

The novel polyahls of this invention preferably have sufficient acyclic moieties selected from the group consisting of urea, thiourea, biuret, dithiobiuret, amide, and thioamide in their backbone in addition to the carbamate moieties near the hydroxyl end groups to act as H-bonding sites when used in urethane/urea polymers and thereby change the polymer properties.

The structure of the 2-hydroxyalkyl carbamate end groups is dependent on the structure of the cyclic alkylene carbonate starting material. For example, if ethylene carbonate or propylene carbonate is used as the starting material, the corresponding end group will be 2-hydroxyethyl carbamate or a mixture of 2-methyl-2-hydroxyethyl carbamate and 1-methyl-2-hydroxyethyl

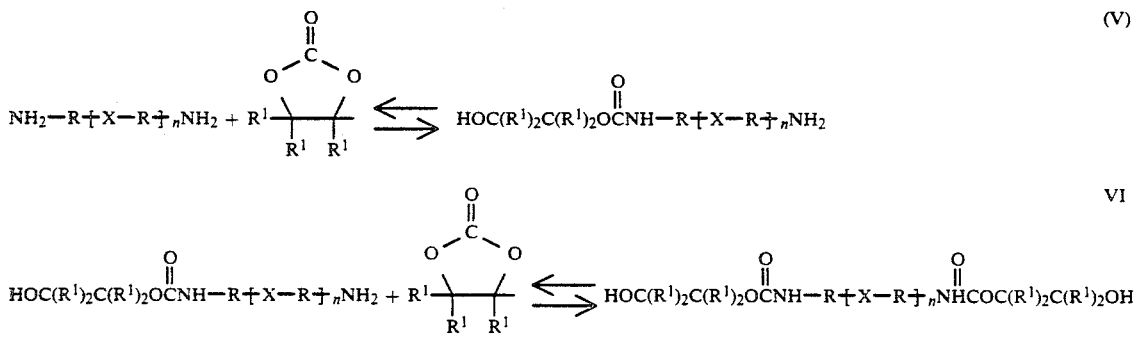

wherein R, $R^1$, X, and n are as defined above. It is important to force this equilibrium to the right to maximize the amount of hydroxyalkyl carbamate moieties that will be present as end groups in the novel compositions of this invention when a high conversion to hydroxyl end groups is required. This can be accomplished by using an excess over stoichiometry of the cyclic alkylene carbonate.

The molecular weights of the end products are increased only by the addition of the 2-hydroxyalkyl carbamate end groups. In most cases, only a small increase in molecular weight occurs. Product molecular weights are preferably in the range of from about 200 to 50,000, more preferably in the range of from about 300 to 25,000 and most preferably in the range of from 500 to 10,000.

If higher molecular weight products are desired, the modified polyamine and the cyclic alkylene carbonate may be contacted in a solvent capable of forming an azeotropic boiling mixture with a monoalkylene glycol by-product of the reaction, under reaction conditions effective to form a higher average molecular weight polyamine compound containing acyclic urea moieties in its backbone, while removing the monoalkylene glycol by-product from the reaction mixture by azeotropic distillation. This process is fully described in copending application Serial No. 310,107, filed Feb. 10, 1989 by the same inventor, which is hereby incorporated by reference in its entirety. Preferably, the molecular weight of the modified polyamine is increased at least about 100 percent. Preferably, the molar ratio of cyclic alkylene carbonate to polyamine compound is in the range of from about 2:1 to about 5:1, and more preferably in the range of from about 0.5:1 to about 2:1. Preferably, the reaction mixture contains a catalytic amount of an organometallic catalyst such as, for example, dibutyltin dilaurate, dimethyltin dilaurate, dibutyltin diacetate, and mixtures thereof. Preferably, the azeotropic solvent used is cumene.

carbamate, respectively.

In a third aspect, this invention is an isocyanate-functional prepolymer which comprises the reaction product of the polyahls of the invention containing hydroxyl and/or amino end groups with an excess over stoichiometry of isocyanates.

The polyisocyanates suitable for these reactions include aliphatic, cycloaliphatic, araliphatic, aromatic and heterocyclic polyisocyanates. Specific examples include ethylene diisocyanate, 1,4-tetramethylene diisocyanate, 1,6-hexamethylene diisocyanate, 1,12-dodecane diisocyanate, cyclobutane-1,3-diisocyanate, cyclohexane-1,3- and 1,4-diisocyanate and mixtures of these isomers: 1-isocyanato-3,3,5-trimethyl-5-isocyanato methyl cyclohexane (see e.g., German Auslegeschrift No. 1,202,785); 2,4- and 2,6-hexahydrotolylene diisocyanate and mixtures of these isomers, hexahydro-1,3- and/or 1,4-phenylene diisocyanate, perhydro-2,5'- and/or 4,4'-diphenyl methane diisocyanate, 1,3- and 1,4-phenylene diisocyanate, 2,4- and 2,6-tolylene diisocyanate and mixtures of these isomers, diphenyl methane-2,4'- and/or 4,4'-diisocyanate, naphthylene-1,5-diisocyanate, triphenyl methane-4,4',4''-triisocyanate, polyphenyl polymethylene polyisocyanates of the type obtained by condensing aniline with formaldehyde, followed by phosgenation and such as described for example in British Patent Nos. 874,430 and 848,671, perchlorinated aryl polyisocyanates of the type described in German Auslegeschrift 1,157,601, polyisocyanates containing carbodiimide groups of the type described in German Patent No. 1,092,007, diisocyanates of the type described in U.S. Pat. No. 3,492,330, polyisocyanates containing allophanate groups of the type described, for example, in British Patent No. 994,890 in Belgian Patent No. 761,626 and in published Dutch Patent Application No. 7,102,524, polyisocyanates containing isocyanurate groups of the type described in German Patent Nos. 1,022,789; 1,222,067 and 1,027,394 and in German Offenlegungsschrift 1,929,034 and 2,004,048, polyisocyanates containing urethane groups of the type described, for example, in Belgian Patent No. 752,261 or in U.S. Pat. No. 3,394,164, polyisocyanates containing acrylated urea groups as described in German Patent No. 1,230,778, polyisocyanates containing biuret groups of the type described, for example, in German Patent No. 1,101,392, in British Patent No. 889,050 and in French Patent No. 7,017,514, polyisocyanates obtained by telomerization reactions of the type described, for example, in Belgian Patent No. 723,640, polyisocyanates containing ester groups of the type described, for example, in British Patent Nos. 965,474 and 1,072,956, in U.S. Pat. No. 3,567,763 and in German Patent No. 1,231,688 and reaction products of the aforementioned isocyanates with acetals as described in German Patent No. 1,072,385.

In addition, derivatives of 4,4'-diphenylmethane diisocyanate which are liquid at room temperature such as, for example, polyisocyanates which have carbodiimide groups in their backbone or mixtures thereof may also be used. The preparation of these materials is disclosed in U.S. Pat. No. 3,152,162, which is hereby incorporated by reference in its entirety. An example of a commercial material of this type is Isonate TM 143L Isocyanate, a product of The Dow Chemical Company.

It is also possible to use the distillation residues containing isocyanate groups accumulating in the commercial production of isocyanates, optionally in solution in one or more of the aforementioned polyisocyanates. In addition, it is possible to use mixtures of the aforementioned polyisocyanates.

Additional polyisocyanates suitable for use in this invention include those described by W. Siefken in Justus Liebigs Annalen der Chemie, 562, pp. 75–136 and in U.S. Pat. Nos. 3,284,479; 4,089,835; 4,093,469; 4,221,876; 4,310,448; 4,359,550 and 4,495,309.

One class of particularly useful polyisocyanates are the aromatic polyisocyanates such as 2,4- and 2,6-tolylene diisocyanate and mixtures of these isomers ("TDI"), polyphenyl-polymethylene polyisocyanates of the type obtained by condensing aniline with formaldehyde, followed by phosgenation ("crude MDI") and, polyisocyanates containing carbodiimide groups, urethane groups, allophanate groups, isocyanurate groups, urea groups or biuret groups ("modified polyisocyanates").

A preferred class of aromatic polyisocyanates is methylene bis(4-phenylisocyanate) or MDI. Pure MDI, quasi- and prepolymers of MDI, modified pure MDI, etc. Materials of this type may be used to prepare suitable RIM elastomers. Since pure MDI is a solid and, thus, often inconvenient to use, liquid products based on MDI are often used and are included in the scope of the terms MDI or methylene bis(4-phenylisocyanate) used herein U S. Pat. No. 3,394,164 is an example of a liquid MDI product. More generally uretonimine modified pure MDI is included also. This product is made by heating pure distilled MDI in the presence of a catalyst.

The isocyanate-functional prepolymers of this invention can be made by addition of excess polyisocyanates to the novel polyahls of this invention or by addition of the novel polyahls of this invention to excess polyisocyanates. The preparation of isocyanate-functional prepolymers by reaction of conventional polyisocyanates with conventional polyols is well-known in the art. Examples can be found in U.S. Pat. Nos. 4,108,842; 4,125,522 and 4,476,292, the relevant portions of which are hereby incorporated by way of reference in their entirety.

A catalyst may be used in the preparation of these prepolymers Catalysts such as tertiary amines or an organic tin compound or other polyurethane catalysts may be used. The organic tin compound may suitably be stannous or stannic compound, such as a stannous salt of a carboxylic acid, a trialkyltin oxide, a dialkyltin dihalide, a dialkyltin oxide, etc., wherein the organic groups of the organic portion of the tin compound are hydrocarbon groups containing from 1 to 18 carbon atoms. For example, dibutyltin dilaurate, dibutyltin diacetate, diethyltin diacetate, dihexyltin diacetate, di-2-ethylhexyltin oxide, dioctyltin dioxide, stannous octoate, stannous oleate, etc., or a mixture thereof, may be used. Other catalysts include organo zinc, mercury and lead compounds.

Tertiary amine catalysts include trialkylamines (e.g., trimethylamine, triethylamine), heterocyclic amines, such as N-alkylmorpholines (e.g., N-methylmorpholine, N-ethylmorpholine, dimethyldiaminodiethyl ether, etc.), 1,4-dimethylpiperazine, triethylenediamine, etc., and aliphatic polyamines, such as N,N,N',N'-tetramethyl-1,3-butanediamine.

In a fourth aspect, this invention is a urethane/urea polymer formed by the reaction of the abovementioned isocyanate-functional prepolymers with polyahls and other active hydrogen-containing compounds are described in U.S. Pat. No. 4,460,715, the relevant portions of which are hereby incorporated by reference. Many of these lower molecular weight polyahls are commonly called chain-extenders when used in processes for the production of urethane/urea polymers. Optionally, catalysts and a variety of additives can be included.

The chain-extenders useful to make such urethane/urea polymers of this invention are preferably difunctional. Mixtures of difunctional and trifunctional chain-extenders are also useful in this invention. The chain-extenders useful in this invention include diols, amino alcohols, diamines or mixtures thereof. Low molecular weight linear diols such as 1,4-butanediol and ethylene glycol have been found suitable for use in this invention. Other chain-extenders including cyclic diols such as 1,4-cyclohexanediol and 1,4-cyclohexanedimethanol; aromatic ring-containing diols such as bishydroxyethylhydroquinone; amide- or ester-containing diols or amino alcohols are useful. Aromatic diamines and aliphatic diamines are suitable chain-extenders Examples include ethylenediamines, 1-(2-aminoisopropyl-4-methyl-4-aminocyclohexane), 1,2-propanediamine, 1,4-butanediamine, 1,6-hexanediamine, diethyltoluenediamine and 1,4-bis(aminomethyl)cyclohexane. Additional examples of useful chain-extenders can be found in U.S. Pat. Nos. 4,297,444; 4,202,957; 4,476,292; 4,495,309 and 4,218,543.

The term "polyahl" as used herein includes any organic compound having at least two active hydrogen moieties wherein the compound has a number average molecular weight ($M_n$) of at least 62. Preferably, the polyahl is a polymer having a $M_n$ of at least 200 and at least three repeating units of a monomeric moiety. For the purposes of this invention, an active hydrogen moiety refers to a moiety containing a hydrogen atom which, because of its position in the molecule, displays significant activity according to the Zerewitinoff test described by Wohler in the Journal of the American Chemical Society, Vol. 49, p.3181 1927). Illustrative of such active hydrogen moieties are —COOH, —OH, —NH₂, —NH—, —CONH₂, —SH, and —CONH—. Typical polyahls include polyols, polyamines, polyamides, polymercaptans and polyacids.

Catalysts may be used in the preparation of these polymers. Any of the catalysts named above a suitable for use in the preparation of prepolymers are suitable for use in the preparation of these polymers. Optional additives include anti-foaming agents such as glycerine, an ethyl acrylate-2-ethylhexyl acrylate copolymer, dimethyl siloxane copolymers and silicones; antioxidants such as esters of β-(3,5-di-tert-butyl-4-hydroxyphenyl) propionic acid with monohydric or polyhydric alcohols, for example, methanol, octadecanol, 1,6-hexanediol, neopentyl glycol, thiodiethylene glycol, diethylene glycol, triethylene glycol, pentaerythritol, trishydroxyethyl isocyanurate, and dihydroxyethyl oxalic acid diamide; UV absorbers and light stabilizers such as 2-(2'-hydroxyphenyl)benzotriazoles and sterically hindered amines such as bis-(2,2,6,6-tetramethylpiperidyl)-sebacate, bis-(1,2,2,6,6-pentamethylpiperidyl)-sebacate, n-butyl-3,5-di-tert-butyl-4-hydroxybenzyl malonic acid bis-(2,2,6,6-pentamethylpiperidyl) ester, condensation product of 1-hydroxyethyl-2,2,6,6-tetramethyl-4-hydroxypiperidine and succinic acid, condensation product of N,N'-(2,2,6,6-tetramethylpiperidyl)-hexamethylene diamine and 4-tert-octylamino-2,6-dichloro-1,3,5-s-triazine, tris-(2,2,6,6-tetramethylpiperidyl)-nitrilotriacetate, tetrakis-(2,2,6,6-tetramethyl-4-piperidyl)-1,2,3,4-butane-tetracarbonic acid and 1,1'-(1,2-ethanediyl)-bis-(3,3,5,5-tetramethylpiperazinone); plasticizers such as phthalates, adipates, glutarates, epoxidized vegetable oils, and the like; fungicides pigments; dyes; reactive dyes; moisture scavengers; and the like. In addition, fillers and reinforcing materials such as chopped or milled glass fibers, chopped or milled carbon fibers and/or other mineral fibers are useful.

Approximately stoichiometric amounts of the isocyanate moieties of the isocyanate-functional prepolymers of this invention and the active hydrogen moieties on the polyahls are used. The equivalent ratio of isocyanate moieties to total active hydrogen moieties is between about 0.90:1.00 to 1.00:1.50; more preferred is an isocyanate:polyahl equivalent ratio of from 0.95:1.00 to 1.00:1.10; most preferred is a ratio of 0.97:1.00 to 1.00:1.05.

In a fifth aspect, this invention is a urethane/urea polymer formed by the reaction of the polyahls of the invention with polyisocyanates, optionally in the presence of other polyahls. Optionally, catalysts and a variety of additives can be included. Useful polyisocyanates, catalysts and additives are those that have been defined hereinabove.

Approximately stoichiometric amounts of the isocyanate moieties on the polyisocyanates and the total active hydrogen moieties of the polyahls of this invention which contain urethane and urea, biuret, thiourea, dithiobiuret, amide, or thioamide moieties in their backbone, are used. The equivalent ratio of isocyanate moieties to total active hydrogen moieties is between about 0.90:1.00 to 1.00:1.50; more preferred is an isocyanate::active hydrogen equivalent ratio of from 0.95:1.00 to 1.00:1.10; most preferred is a ratio of 0 97:1.00 to 1.00:1.05. The preparation of urethane/urea polymers is well-known in the art. Examples of typical reaction conditions employed can be found in U.S. Pat. Nos. 4,460,715 and 4,394,491, the relevant portions of which are hereby incorporated by way of reference in their entirety.

The urethane/urea polymers of the present invention can be fabricated by any fabrication technique known in the art. Useful processes include hand casting (see, for example, U.S. Pat. No. 4,476,292) and reaction injection molding (see, for example U.S. Pat. Nos. 4,297,444 and 4,495,309).

ILLUSTRATIVE EMBODIMENTS

The following examples are given to illustrate the invention and should not be interpreted as limiting it in any way. Unless stated otherwise, all parts and percentages are given by weight.

EXAMPLE 1

Reaction Product of Diamine Containing Four Urea Moieties in its Backbone with Ethylene Carbonate; Ethylene Carbonate:Diamine Molar Ratio=2:1

A diamine containing four urea moieties per average backbone molecule is prepared by reacting Jeffamine TM D-400 (an aminated poly(propylene glycol) of approximately 400 molecular weight manufactured by Texaco) with urea using a 1.20:1 molar ratio of Jeffamine TM D-400:urea. This diamine (181.5 g, 0.072 mole, MW=2510) and ethylene carbonate (12.73 g, 0.145 mole) are combined in a 500-ml reactor equipped with an overhead stirrer, thermometer, condenser, temperature controller and maintained under a nitrogen atmosphere. The reactor is heated at 110° C. for 6 hours. The product is obtained as a viscous liquid: Brookfield viscosity, 256,000 cps at 22° C.; 0.233 meq amine/g by titration with 0.1N HC₁O₄; 68.7 percent amine conversion; calculated average molecular weight is 2631 by end group titration.

¹³C nuclear magnetic resonance (DMSO-d₆) shows urea carbonyl moieties (157.5 ppm) and urethane carbonyl moieties (156.2 ppm). The methylene carbon atoms associated with the hydroxyl end group are present at 59.6 and 65.5 ppm (carbon atoms α to hydroxyl end group and β to urethane moiety and carbon atoms β to hydroxyl end group and α to urethane moiety, respectively). The methyne carbon atoms adjacent to unreacted amino end groups are present at 46.2/46.4 ppm. Unreacted ethylene carbonate is not detected by nuclear magnetic resonance.

This example shows the preparation of a product which contains internal urea moieties in its backbone. A substantial amount of amino end groups (~31 percent) are still present. Hydroxyl end groups linked by urethane moieties account for the majority of the product.

EXAMPLE 2

Reaction Product of Diamine Containing Four Urea Moieties in its Backbone with Ethylene Carbonate; Ethylene Carbonate:Diamine Molar Ratio=4:1

The same diamine containing four urea moieties per average backbone molecule used in Example 1 (188.7 g, 0.075 mole, MW=2510) and ethylene carbonate (26.47 g, 0.301 mole) are combined in the same reaction setup used in Example 1. The reactor is heated at 100° C for 6 hours. The product is obtained as a viscous liquid: Brookfield viscosity, 145,000 cps at 22° C: 0.0712 meq amine/g by titration with 0.1N HClO₄; 89.8 percent amine conversion: calculated average molecular weight is 2668 by end group titration.

$^{13}$C nuclear magnetic resonance (DMSO-d$_6$) shows urea carbonyl moieties (157.5 ppm), urethane carbonyl moieties (156.2 ppm) and some unreacted ethylene carbonate (carbonyl moieties and methylene carbon atoms at 155.9 and 64.9 ppm, respectively). The methylene carbon atoms associated with the hydroxyl end group are present at 59.7 and 65.5 ppm (carbon atoms c to hydroxyl end group and β t urethane moiety and carbon atoms β to hydroxyl end group and α to urethane moiety, respectively). The methyne carbon atoms adjacent to the internal urea moieties are present at 44.9/45.1 ppm.

This example shows the preparation of a product which contains internal urea moieties in its backbone. A small amount of amino end groups (~10 percent) are still present. Hydroxyl end groups linked by urethane moieties account for the majority of the product. This is an equilibrium reaction and some unreacted ethylene carbonate is present.

EXAMPLE 3

Reaction Product of Diamine Containing Six Amide Moieties in its Backbone with Ethylene Carbonate: Ethylene Carbonate:Diamine Molar Ratio=4:1

A diamine containing six amide moieties per average backbone molecule is prepared by reacting Jeffamine TM D-400 with adipic acid using a 1.30:1 molar ratio of Jeffamine TM D-400:adipic acid. This diamine containing six amide moieties per average backbone molecule (192.4 g, 0.0960 mole, MW=2004) and ethylene carbonate (33.80 g, 0.384 mole) are combined in the same reaction setup used in Example 1. The reactor is heated at 110° C. for 6 hours. The product is obtained as a viscous liquid: Brookfield viscosity, 80,100 cps at 22° C.: 0.0848 meq amine/g by titration with 0.1N HClO$_4$; 90.0 percent amine conversion: calculated average molecular weight is 2162 by end group titration.

$^{13}$C nuclear magnetic resonance (DMSO-d$_6$) shows amide carbonyl moieties (172.0 ppm), urethane carbonyl moieties (156.2 ppm) and some unreacted ethylene carbonate (carbonyl moieties and methylene carbon atoms at 155.9 and 65.0 ppm, respectively). The methylene carbon atoms associated with the hydroxyl end group are present at 59.7 and 65.6 ppm (carbon atoms α to hydroxyl end group and β to urethane moiety and carbon atoms β to hydroxyl end group and α to urethane moiety, respectively). Hydroxyl end groups linked by urethane moieties account for the majority of the product. The methyne carbon atoms adjacent to the internal amide moieties are present at 44.3/44.5 ppm.

This example shows the preparation of a product which contains internal amide moieties in its backbone. A small amount of amino end groups (-10 percent) are still present. This is an equilibrium reaction and some unreacted ethylene carbonate is present.

EXAMPLE 4

Reaction Product of Diamine Containing Four Biuret Moieties in its Backbone with Ethylene Carbonate; Ethylene Carbonate:Diamine Molar Ratio=4:1

A diamine containing four biuret moieties per average backbone molecule is prepared by reacting Jeffamine TM D-400 with biuret using a 1.25:1 molar ratio of Jeffamine TM D-400:biuret. This diamine containing four biuret moieties per average backbone molecule (171.4 g, 0.0767 mole, MW=2236) and ethylene carbonate (26.99 g, 0.3067 mole) are combined in the same reaction setup used in Example 1. The reactor is heated at 110° C. for 6 hours. The product is obtained as a viscous liquid: Brookfield viscosity, 238,000 cps at 22° C.; 0.134 meq amine/g by titration with 0.1N HClO$_4$; 82.7 percent amine conversion; calculated average molecular weight is 2382 by end group titration.

$^{13}$C nuclear magnetic resonance (DMSO-d$_6$) shows biuret carbonyl moieties (154.5 ppm), urethane carbonyl moieties (156.3 ppm) and some unreacted ethylene carbonate (carbonyl moieties and methylene carbon atoms at 155.9 and 65.0 ppm, respectively). The methyne carbon atoms adjacent to the internal biuret moieties are present at 45.0/45.2 ppm.

This example shows the preparation of a product which contains internal amide moieties in its backbone. Some amino end groups (~17 percent) are still present. Hydroxyl end groups linked by urethane moieties account for the majority of the product. This is an equilibrium reaction and some unreacted ethylene carbonate is present.

EXAMPLE 5

Reaction Product of Diamine Containing Four Urea Moieties in its Backbone with Propylene Carbonate at 110° C.: Propylene Carbonate:Diamine Molar Ratio=4:1

The same diamine containing four urea moieties per average backbone molecule used in Example 1 (200.6 g, 0.0799 mole, MW=2510) and propylene carbonate (32.62 g, 0.320 mole) are combined in the same reaction setup used in Example 1. The reactor is heated at 110° C. for 7 hours. The product is obtained as a viscous liquid: Brookfield viscosity, 57,200 cps at 22° C.; 0.0603 meq amine/g by titration with 0.1N HClO$_4$; 91.2 percent amine conversion; calculated average molecular weight is 2696 by end group titration.

$^{13}$C nuclear magnetic resonance (DMSO-d$_6$) shows urea carbonyl moieties (157.5 ppm), urethane carbonyl moieties (155.8 and 156.2 ppm) and some unreacted propylene carbonate (carbonyl moieties at 155.2 ppm). the methyne carbon atoms adjacent to the internal urea moieties are present at 44.9/45.1 ppm.

This example shows the preparation of a product which contains internal urea moieties in its backbone. A small amount of amino end groups (~8 percent) are still present. Hydroxyl end groups linked by urethane moieties account for the majority of the product. This is an equilibrium reaction and some unreacted propylene carbonate is present.

EXAMPLE 6

Reaction Product of Diamine Containing Four Urea Moieties in its Backbone with Propylene Carbonate at 125° C.; Propylene Carbonate:Diamine Molar Ratio=4:1

The same diamine containing four urea moieties per average backbone molecule used in Example 1 (188.9 g, 0.0753 mole, MW=2510) and propylene carbonate (30.73 g, 0.301 mole) are combined in the same reaction setup used in Example 1. The reactor is heated at 125° C. for 7 hours. The product is obtained as a viscous liquid: Brookfield viscosity, 93,200 cps at 22° C.; 0.0687 meq amine/g by titration with 0.1N HClO$_4$; 90.0 percent amine conversion; calculated average molecular weight is 2690 by end group titration.

$^{13}$C nuclear magnetic resonance (DMSO-d$_6$) shows urea carbonyl moieties (157.5 ppm), urethane carbonyl moieties (155.8 and 156.2 ppm) and some unreacted propylene carbonate (carbonyl moieties at 155.2 ppm). the methyne carbon atoms adjacent to the internal urea moieties are present at 44.9/45.1 ppm.

This example shows the preparation of a product which contains internal urea moieties in its backbone. A small amount of amino end groups (~10 percent) are still present. Hydroxyl end groups linked by urethane moieties account for the majority of the product. This is an equilibrium reaction and some unreacted propylene carbonate is present.

EXAMPLE 7

Reaction Product of Diamine Containing Four Amide Moieties and One Urea Moiety in its Backbone with Ethylene Carbonate: Ethylene Carbonate:Diamine Molar Ratio=4:1

A diamine containing two amide moieties per average backbone molecule is first prepared by reacting Jeffamine TM D-400 with adipic acid using a 2.0:1 molar ratio of Jeffamine TM D-400:adipic acid under conditions sufficient to form the corresponding amide. The diamine product containing two amide moieties per average molecule is reacted with urea using a 2.0:1 equivalent ratio of the diamine to urea. The resulting diamine containing four amide moieties and one urea moiety per average backbone molecule (150.72 g, 0.0771 mole, MW-1956) and ethylene carbonate (27.12 g, 0.3082 mole) are combined in the same reaction setup used in Example 1. The reactor is heated at 110° C. for 5 hours. The product is obtained as a viscous liquid: Brookfield viscosity, 68,500 cps at 22° C.; 0.0660 meq amine/g by titration with 0.1N HClO4; 92.4 percent amine conversion: calculated average molecular weight is 2119 by end group titration.

$^{13}$C nuclear magnetic resonance (DMSO-d$_6$) shows amide carbonyl moieties (172.0 ppm), urea carbonyl moieties (157.6 ppm), urethane carbonyl moieties (156.2 ppm) and some unreacted ethylene carbonate (carbonyl moieties and methylene carbon atoms at 155.9 and 65.0 ppm, respectively). The methylene carbon atoms associated with the hydroxyl end group are present at 59.7 and 65.6 ppm carbon atoms α to hydroxyl end group and β to urethane moiety and carbon atoms β to hydroxyl end group and α to urethane moiety, respectively). The methyne carbon atoms adjacent to the internal amide moieties are present at 44.3/44.5 ppm and the methyne carbon atoms adjacent to the internal urea moieties are present at 44.9/45.1 ppm.

This example shows the preparation of a product which contains both internal amide and urea moieties in its backbone. A small amount of amino end groups (~7 percent) are still present. Hydroxyl end groups linked by urethane moieties account for the majority of the product. This is an equilibrium reaction and some unreacted ethylene carbonate is present.

EXAMPLE 8

Reaction Product of Diamine Containing Three Thiourea Moieties in its Backbone with Ethylene Carbonate: Ethylene Carbonate:Diamine Molar Ratio=4:1

A diamine containing three thiourea moieties per average backbone molecule is prepared by reacting Jeffamine TM D-400 with thiourea using a 1.20:1 molar ratio of Jeffamine TM D-400:thiourea. This diamine containing three thiourea moieties per average backbone molecule (214.91 g, 0.100 mole, MW=2149) and ethylene carbonate (35.23 g, 0.400 mole) are combined in the same reaction setup used in Example 1. The reactor is heated at 110° C. for 6 hours. The product is obtained as a viscous liquid: Brookfield viscosity, 94,900 cps at 22° C.; 0.288 meq amine/g by titration with 0.1N HClO4; 64.0 percent amine conversion: calculated average molecular weight is 2262 by end group titration.

$^{13}$C nuclear magnetic resonance (DMSO-d$_6$) shows thiourea carbonyl moieties (181.7 ppm), urethane carbonyl moieties (156.2 ppm) and some unreacted ethylene carbonate (carbonyl moieties and methylene carbon atoms at 155.8 and 64.9 ppm, respectively). The methylene carbon atoms associated with the hydroxyl end group are present at 59.7 and 65.5 ppm (carbon atoms α to hydroxyl end group and β to urethane moiety and carbon atoms β to hydroxyl end group and u to urethane moiety, respectively). The methyne carbon atoms present adjacent to the internal thiourea moieties are present at 48.9/49.1 ppm.

This example shows the preparation of a product which contains internal thiourea moieties in its backbone. Some amino end groups (~36 percent) are still present. Hydroxyl end groups linked by urethane moieties account for the majority of the product. This is an equilibrium reaction and some unreacted ethylene carbonate is present.

EXAMPLE 9

Reaction Product of Diamine Containing Three Urea Moieties in its Backbone and Based on Jeffamine TM D-400 and 2-Methyl-1,5-pentanediamine with Ethylene Carbonate: Ethylene Carbonate:Diamine Molar Ratio=4:1

A diamine containing about three urea moieties per average backbone molecule is prepared by reacting Jeffamine TM D-400 (230.0 g, 0.500 mole, MW=460) and 2-methyl-1,5-pentanediamine (11.67 g, 0.100 mole) with urea (30.03 g, 0.500 mole) at 150° C. for 23 hours. The diamine is obtained as a viscous liquid: Brookfield viscosity, 47,250 cps at 22° C.; 1.2006 meq amine/g by titration with 0.1N HClO4; calculated average molecular weight is 1666 by end group titration: 3.2 urea moieties per average molecule by titration with 0.1N HClO4. A portion of this diamine (200.01 g, 0.120 mole) and ethylene carbonate (42.28 g, 0.480 mole) are combined in the same reaction setup used in Example 1. The reactor is heated at 110° C. for 6 hours. The product is obtained as a viscous liquid: Brookfield viscosity, 68,700 cps at 22° C.: 0.233 meq amine/g by titration with 0.1N HClO4; 80.0 percent amine conversion: calculated average molecular weight is 1803 by end group titration.

$^{13}$C nuclear magnetic resonance (DMSO-d$_6$) shows urea carbonyl moieties (157.5 ppm, D-400/D-400 urea: 158.2/158.3 ppm, D-400/2-Me-PDA urea: and 158.9 ppm, 2-Me-PDA/2-Me-PDA urea) and urethane carbonyl moieties (156.2 ppm). The methylene carbon atoms associated with the hydroxyl end group are present at 59.7 and 65.6 ppm (carbon atoms α to hydroxyl end group and β to urethane moiety and carbon atoms β to hydroxyl end group and α to urethane moiety, respectively). The methyne carbon atoms adjacent to unreacted amino end groups are present at 46.2/46.4 ppm. Unreacted ethylene carbonate is present (155.9 ppm and 65.0 ppm).

This example shows the preparation of a product which contains three different kinds of internal urea moieties in its backbone since it was prepared from two different amines. Some amino end groups (~20 percent) are still present. Hydroxyl end groups linked by urethane moieties account for the majority of the product. This is an equilibrium reaction and some unreacted ethylene carbonate is present.

EXAMPLE 10

Reaction Product of Diamine Containing Four Urea Moieties in its Backbone and Based on Jeffamine TM D-400 and 1,6-Hexanediamine with Ethylene Carbonate: Ethylene Carbonate:Diamine Molar Ratio=4:1

A diamine containing four urea moieties per average backbone molecule is prepared by reacting Jeffamine TM D-400 (253.1 g, 0.550 mole, MW=460) and 1,6-hexanediamine (5.87 g, 0.050 mole) with urea (30.03 g, 0.500 mole) at 150° C. for 24 hours. The diamine is obtained as a viscous liquid: Brookfield viscosity, >2,000,000 cps at 22° C.; 0.9075 meq amine/g by titration with 0.1N $HClO_4$; calculated average molecular weight is 2204 by end group titration; 4.0 urea moieties per average molecule by titration with 0.1N $HClO_4$. A portion of this diamine (200.06 g, 0.0907 mole) and ethylene carbonate (31.98 g, 0.363 mole) are combined in the same reaction setup used in Example 1. The reactor is heated at 110° C. for 6 hours. The product is obtained as a viscous liquid: Brookfield viscosity, 133,200 cps at 22° C.: 0.252 meq amine/g by titration with 0.1N $HClO_4$; 67.8 percent amine conversion: calculated average molecular weight is 2317 by end group titration.

$^{13}C$ nuclear magnetic resonance (DMSO-$d_6$) shows urea carbonyl moieties (157.5 ppm, D-400/D-400 urea: 158.1 ppm, D-400/HDA urea: and 158.8 ppm, HDA/HDA urea) and urethane carbonyl moieties (156.2 ppm). The methylene carbon atoms associated with the hydroxyl end group are present at 59.7 and 65.6 ppm (carbon atoms u to hydroxyl end group and $\beta$ to urethane moiety and carbon atoms $\beta$ to hydroxyl end group and $\alpha$ to urethane moiety, respectively). The methyne carbon atoms adjacent to unreacted amino end groups are present at 46.2/46.4 ppm. Unreacted ethylene carbonate is present (155.9 ppm and 65.0 ppm).

This example shows the preparation of a product which contains three different kinds of internal urea moieties in its backbone since it was prepared from two different diamines. Some amino end groups (~32 percent) are still present. Hydroxyl end groups linked by urethane moieties account for the majority of the product. This is an equilibrium reaction and some unreacted ethylene carbonate is present.

EXAMPLE 11

Reaction Product of Diamine Containing Two Thiourea Moieties in its Backbone and Based on Jeffamine TM D-400 and 2-Methyl-1,5-pentanediamine with Ethylene Carbonate: Ethylene Carbonate:Diamine Molar Ratio=2:1

A diamine containing about two thiourea moieties per average backbone molecule is prepared by reacting Jeffamine TM D-400 (230.0 g, 0.500 mole, MW=460) and 2-methyl-1,5-pentanediamine (11.62 g, 0.100 mole) with thiourea (38.07 g, 0.500 mole) at 150° C. for 23 hours. The diamine is obtained as a viscous liquid: Brookfield viscosity, 76,100 cps at 22° C.: 1.414 meq amine/g by titration with 0.1N $HClO_4$; calculated average molecular weight is 1414 by end group titration: 2.3 urea moieties per average molecule by titration with 0.1 N $HClO_4$. A portion of this diamine (200.07 g, 0.1414 mole) and ethylene carbonate (24.94 g, 0.283 mole) are combined in the same reaction setup used in Example 1. The reactor is heated at 110° C. for 6 hours. The product is obtained as a viscous liquid: Brookfield viscosity, 287,200 cps at 22° C.: 0.3222 meq amine/g by titration with 0.1N $HClO_4$; 74.4 percent amine conversion: calculated average molecular weight is 1545 by end group titration.

$^{13}C$ nuclear magnetic resonance (DMSO-$d_6$) shows thiourea carbonyl moieties (181.8 ppm) and urethane carbonyl moieties (156.1 ppm). The methylene carbon atoms associated with the hydroxyl end group are present at 59 6 and 65.6 ppm (carbon atoms $\alpha$ to hydroxyl end group and $\beta$ to urethane moiety and carbon atoms $\beta$ to hydroxyl end group and $\alpha$ to urethane moiety, respectively). The methyne carbon atoms adjacent to unreacted amino end groups are present at 46.2/46.4 ppm. Ethylene carbonate is not detected This example shows the preparation of a product which contains internal thiourea moieties in its backbone. Some amino end groups (~25 percent) are still present. Hydroxyl end groups linked by urethane moieties account for the majority of the product.

EXAMPLE 12

Reaction Product of Diamine Containing Nine Amide Moieties in its Backbone and Based on Jeffamine TM D-400 and 2-Methyl-1,5-pentanediamine with Ethylene Carbonate; Ethylene Carbonate:Diamine Molar Ratio=4:1

A diamine containing about nine amide moieties per average backbone molecule is prepared by reacting Jeffamine TM D-400 (230.0 g, 0.500 mole, MW=460) and 2-methyl-1,5-pentanediamine (11.69 g, 0.100 mole) with adipic acid (73.09 g, 0.500 mole) at 170° C. for 23 hours, while removing the water by-product (18.0 ml, 1.00 mole) by separating the water-toluene azeotropically boiling mixture. The diamine product is obtained after heating at 150° C. and 1 mm Hg vacuum for 5 hours to remove toluene. The diamine is obtained as a viscous liquid: Brookfield viscosity, >2,000,000 cps at 22° C.: 0.7046 meq amine/g by titration with 0.1N $HClO_4$; calculated average molecular weight is 2838 by end group titration. A portion of this diamine (200.04 g, 0.0705 mole) and ethylene carbonate (25.13 g, 0.282 mole) are combined in the same reaction setup used in Example 1. The reactor is heated at 110° C. for 6 hours. The product is obtained as a viscous liquid: Brookfield viscosity, >2,000,000 cps at 22° C.: 0.626 meq amine/g by titration with 0.1N $HClO_4$; 55.3 percent amine conversion: calculated average weight is 2935 by end group titration.

$^{13}C$ nuclear magnetic resonance (DMSO-$d_6$) shows amide carbonyl moieties (171.9 ppm, D-400 amide and 172.4/172.6 ppm, 2-Me-PDA amide) and urethane carbonyl moieties (156 2 ppm). The methylene carbon atoms associated with the hydroxyl end group are present at 59.6 and 65.5 ppm (carbonyl atoms $\alpha$ to hydroxyl end group and $\beta$ to urethane moiety and carbon atoms $\beta$ to hydroxyl end group and $\alpha$ to urethane moiety, respectively). The methyne carbon atoms adjacent to unreacted amino end groups are present at 46.2/46.4 ppm. Unreacted ethylene carbonate is present (155.9 ppm and 65.0 ppm).

This example shows the preparation of a product which contains two kinds of internal amide moieties in its backbone, since it is prepared from two different diamines. A substantial amount of amino end groups (~45 percent) are still present. Hydroxyl end groups linked by urethane moieties account for the majority of the product.

EXAMPLE 1

Reaction Product of Diamine Containing About Four Urea Moieties in its-Backbone and Based on Jeffamine TM D-400 and 2,4-Toluenediamine with Ethylene Carbonate; Ethylene Carbonate:Diamine Molar Ratio=4:1

A diamine containing about four urea moieties per average backbone molecule is prepared by reacting Jeffamine TM D-400 (253.02 g, 0.550 mole, MW=460) and 2,4-toluenediamine (6.11 g, 0.050 mole) with urea (30.04 g, 0.500 mole) at 150° C. for 25 hours. The diamine is obtained as a viscous liquid: Brookfield viscosity, 153,600 cps at 22° C.; 0.9073 meq amine/g by titration with 0.1N HClO$_4$; calculated average molecular weight is 2204 by end group titration. A portion of this diamine (200.04 g, 0.0907 mole) and ethylene carbonate (16.01 g, 0.1815 mole) are combined in the same reaction setup used in Example 1. The reactor is heated at 110° C. for 6 hours. The product is obtained as a viscous liquid: Brookfield viscosity, 246,800 cps at 22° C.; 0.479 meq amine/g by titration with 0.1N HClO$_4$; 42.9 percent amine conversion: calculated average molecular weight is 2280 by end group titration.

$^{13}$C nuclear magnetic resonance (DMSO-d$_6$) shows urea carbonyl moieties (157.5 ppm and 158.7 ppm) and urethane carbonyl moieties (156.2 ppm). The methylene carbon atoms associated with the hydroxyl end group are present at 59.6 and 65.5 ppm (carbon atoms α to hydroxyl end group and β to urethane moiety and carbon atoms β to hydroxyl end group and α to urethane moiety, respectively). The methyne carbon atoms adjacent to unreacted amino end groups are present at 46.2/46.4 ppm. Unreacted ethylene carbonate is present (155.8 ppm and 65.0 ppm).

This example shows the preparation of a product which contains two kinds of internal urea moieties in its backbone, since it it prepared from two different diamines. A substantial amount of amino end groups (~57 percent) are still present. Hydroxyl end groups linked by urethane moieties account for a large portion of the product.

COMPARATIVE EXAMPLE 1

Preparation of an Isocyanate-Functional Prepolymer Comprised of Isonate TM 143LM and Voranol TM 2120

A silanized, 100-ml resin kettle with a four-necked top is equipped with a mechanical stirrer, thermometer, vacuum inlet and a pressure equalizing addition funnel capped with a rubber septum. The kettle is heated to 40° C. in an oil bath and then charged with 40.20 g (0.2740 equivalents) of Isonate TM 143LM (a version of Isonate TM 143L which has a higher percentage of the para-para isomer; trademark of The Dow Chemical Company). The stirrer is then started and the kettle is placed under a vacuum of 0.5 mm Hg. Voranol TM 2120 (49.95 g, 0.0495 equivalents: a 2000 MW polypropylene glycol, sold by The Dow Chemical Company is charged to the addition funnel through the septum via a syringe.

The Voranol TM 2120 is then added dropwise to the kettle over a 45-minute period while the stirring and vacuum are maintained. A 5 percent dibutyltin dilaurate catalyst solution 0.474 g) in Voranol TM 2120 is added to the prepolymer (0.0027 weight percent).

After a reaction time of approximately 3 hours, a standard HCl/di-n-butylamine titration (ASTM D-1638-74) is done to determine the prepolymer's equivalent weight. The prepolymer's equivalent weight is 406.98 cent.

COMPARATIVE EXAMPLE 2

Preparation of a Polymer Based on 1,4-Butanediol and the Prepolymer made in Comparative Example 1

The reaction setup and equipment are used that were used in Comparative Example 1. 1,4-Butanediol (9.64 g, 0.2139 equivalents) is added to the prepolymer through the septum via a syringe. The mixture is stirred under vacuum for approximately one minute. The vacuum is then broken and the contents of the kettle poured into a 4"×4"×0.125" steel window mold lined with mylar sheets. The mold is then closed and placed in a 150° C. oven for one hour after which it is removed and allowed to cool before being opened. The amount of 1,4-butanediol added is calculated to give a hard segment content of 50 weight percent. The Index (ratio of isocyanate groups to hydroxyl groups) is 1.03. This polymer is used as a control for the study of polymers made with the materials described in Examples 1–4 and 7.

After being removed from the mold, the plaque is post-cured at 150° C. for one hour in a vacuum oven and cut apart for testing. Test results are given hereinbelow.

EXAMPLE 14

Preparation of an Isocyanate-Functional Prepolymer Comprised of Isonate TM 143LM and a 90/10 Weight Blend of Voranol TM 2120 and the Material Made in Example 2

A silanized, 100-ml resin kettle with a four-necked top was equipped with a mechanical stirrer, thermometer, vacuum inlet and a pressure equalizing addition funnel capped with a rubber septum. The kettle is heated to 50° C. in an oil bath and then charged with 5.12 g (0.0045 equivalents) of the material made in Example 2 and 40.07 g (0.2769 equivalents) of Isonate TM 143LM (a version of Isonate TM 143L which has a higher percentage of the para-para isomer). The stirrer is then started and the kettle is placed under a vacuum of 0.5 mm Hg. Voranol TM 2120 (45.07 g, 0.0447 equivalents) is charged to the addition funnel through the septum via a syringe. The Voranol TM 2120 is then added dropwise to the kettle over a 45-minute period while the stirring and vacuum are maintained.

After a reaction time of approximately 3 hours, a standard HCl/di-n-butylamine titration (ASTM D-1638-74) is done to determine the prepolymer's equivalent weight. The prepolymer's equivalent weight is 403.80 g/equivalent with an NCO content of 10.40 weight percent.

EXAMPLE 15

Preparation of a Polymer Based on 1,4-Butanediol and the Prepolymer Made in Example 14

1,4-Butanediol (7.33 g, 0.1627 equivalents) and 67.50 g (0.1672 equivalents) of the prepolymer made in Example 14 are mixed together in a disposable beaker for 1.5 minutes and the contents are poured into a 4"×4"×0.125" steel window mold lined with mylar sheets. The mold is then closed and placed in a 150° C. oven for one hour after which it is removed and allowed to cool before being opened. The amount of 1,4-butanediol added is calculated to give a hard segment content of 50 weight percent. The Index (ratio of isocyanate groups to hydroxyl groups) is 1.03.

After being removed from the mold, the plaque is post-cured at 150° C. for one hour in a vacuum oven and cut apart for testing. Test results are given hereinbelow.

EXAMPLE 16

Preparation of an Isocyanate-Functional Prepolymer Comprised of Isonate TM 143LM and an 80/20 Weight Blend of Voranol TM 2120 and the Material Made in Example 2

The reaction setup is the same as used in Example 14. The kettle is heated to 55° C. in an oil bath and then charged with 10.18 g (0.0076 equivalents) of the material made in Example 2 and 40.02 g (0.2765 equivalents) of Isonate TM 143LM. The stirrer is then started and the kettle is placed under a vacuum of 0.5 mm Hg. Voranol TM 2120 (39.84 g, 0.0395 equivalents) is charged to the addition funnel through the septum via a syringe. The Voranol TM 2120 is then added dropwise to the kettle over a 45-minute period while the stirring and vacuum are maintained.

After a reaction time of approximately 2 hours, a standard HCl/di-n-butylamine titration is done to determine the prepolymer's equivalent weight. The prepolymer's equivalent weight is 408.50 g/equivalent with an NCO content of 10.28 weight percent.

EXAMPLE 17

Preparation of a Polymer Based 1,4-Butanediol and the Prepolymer Made in Example 16

1,4-Butanediol (6.95 g, 0.1542 equivalents) and 63.66 g (0.1558 equivalents) of the prepolymer made in Example 16 are mixed together in a disposable beaker for 1.25 minutes and the contents are poured into a 4"×4"×0.125" steel window mold lined with mylar sheets. The mold is then closed and placed in a 150° C. oven for one hour after which it is removed and allowed to cool before being opened. The amount of 1,4-butanediol added is calculated to give a hard segment content of 50 weight percent. The Index is 1.01.

After being removed from the mold, the plaque is post-cured at 150° C. for one hour in a vacuum oven and cut apart for testing. Test results are given hereinbelow.

EXAMPLE 18

Preparation of an Isocyanate-Functional Prepolymer Comprised of Isonate TM 143LM and an 70/30 Weight Blend of Voranol TM 2120 and the Material Made in Example 2

The reaction setup is the same as used in Example 14. The kettle is heated to 55° C. in an oil bath and then charged with 15.44 g (0.0116 equivalents) of the material made in Example 2 and 40.13 g (0.2773 equivalents) of Isonate TM 143LM. The stirrer is then started and the kettle is placed under a vacuum of 0.5 mm Hg. Voranol TM 2120 (34.55 g, 0.0342 equivalents) is charged to the addition funnel through the septum via a syringe. The Voranol TM 2120 is then added dropwise to the kettle over a 45-minute period while the stirring and vacuum are maintained.

After a reaction time of approximately 3 hours, a standard HCl/di-n-butylamine titration is done to determine the prepolymer's equivalent weight. The prepolymer's equivalent weight is 418.90 g/equivalent with an NCO content of 10.03 weight percent.

EXAMPLE 19

Preparation of a Polymer Based on 1,4-Butanediol and the Prepolymer Made in Example 18

1,4-Butanediol (6.52 g, 0.1447 equivalents) and 2.31 g (0.1487 equivalents) of the prepolymer made in Example 18 are mixed together in a disposable beaker for minute and the contents are then poured into a 4"×0.125" steel window mold lined with mylar sheets. The mold is then closed and placed in a 150° C. oven for one hour after which it is removed and allowed to cool before being opened. The amount of 1,4-butanediol added is calculated to give a hard segment content of 50 weight percent. The Index is 1.03.

After being removed from the mold, the plaque is post-cured at 150° C. for one hour in a vacuum oven and cut apart for testing. Test results are given hereinbelow.

EXAMPLE 20

Preparation of an Isocyanate-Functional Prepolymer Comprised of Isonate=143LM and an 70/30 Weight Blend of Voranol TM 2120 and the Material Made in Example 3

The reaction setup is the same as used in Example 14. The kettle is heated to 50° C. in an oil bath and then charged with 15.34 g (0.0142 equivalents) of the material made in Example 3 and 40.13 g (0.2707 equivalents) of Isonate TM 143LM. The stirrer is then started and the kettle is placed under a vacuum of 0.5 mm Hg. Voranol TM 2120 (34.68 g, 0.0344 equivalents) is charged to the addition funnel through the septum via a syringe. The Voranol TM 2120 is then added dropwise to the kettle over a 45-minute period while the stirring and vacuum are maintained.

After a reaction time of approximately 4 hours, a standard HCl/di-n-butylamine titration is done to determine the prepolymer's equivalent weight. The prepolymer's equivalent weight is 395.52 g/equivalent with an NCO content of 10.63 weight percent.

EXAMPLE 21

Preparation of a Polymer Based on 1,4-Butanediol and the Prepolymer Made in Example 20

The reaction setup and equipment are used that were used in Example 20. 1,4-Butanediol (9.79 g, 0.2173 equivalents) is added to the prepolymer through the septum via a syringe. The mixture is stirred under vacuum for approximately one minute. The vacuum is then broken and the contents of the kettle poured into a 4"×4"×0.125" steel window mold lined with mylar sheets. The mold is then closed and placed in a 150° C.

oven for one hour after which it is removed and allowed to cool before being opened. The amount of 1,4-butanediol added is calculated to give a hard segment content of 50 weight percent. The Index is 1.03.

After being removed from the mold, the plaque is post-cured at 150° C. for one hour in a vacuum oven and cut apart for testing. Test results are given hereinbelow.

EXAMPLE 22

Preparation of an Isocyanate-Functional Prepolymer Comprised of Isonate TM 143LM and an 80/20 Weight Blend of Voranol TM 2120 and the Material Made in Example 1

The reaction setup is the same as used in Example 1. The kettle is heated to 55° C. in an oil bath and then charged with 10.24 g (0.0078 equivalents) of the material made in Example 1 and 39.78 g (0.2684 equivalents) of Isonate TM 143LM The stirrer is then started and the kettle is placed under a vacuum of 0.5 mm Hg. Voranol TM 2120 (39.65 g, 0.0393 equivalents) is charged to the addition funnel through the septum via a syringe. The Voranol TM 2120 is then added dropwise to the kettle over a 45-minute period while the stirring and vacuum are maintained.

After a reaction time of approximately 3 hours, a standard HCl/di-n-butylamine titration is done to determine the prepolymer's equivalent weight. The prepolymer's equivalent weight is 410.05 g/equivalent with an NCO content of 10.24 weight percent.

EXAMPLE 23

Preparation of a Polymer Based on 1,4-Butanediol and the Prepolymer Made in Example 22

The reaction setup and equipment are used that were used in Example 22. 1,4-Butanediol (9.32 g, 0.2068 equivalents) is added to the prepolymer through the septum via a syringe. The mixture is stirred under vacuum for approximately 1.5 minutes. The vacuum is then broken and the contents of the kettle poured into a 4"×4"×0.125" steel window mold lined with mylar sheets. The mold is then closed and placed in a 150° C. oven for one hour after which it is removed and allowed to cool before being opened. The amount of 1,4-butanediol added is calculated to give a hard segment content of 50 weight percent. The Index is 1.03.

After being removed from the mold, the plaque is post-cured at 150° C. for one hour in a vacuum oven and cut apart for testing. Test results are given hereinbelow.

EXAMPLE 24

Preparation of an Isocyanate-Functional Prepolymer Comprised of Isonate TM 143LM and an 80/20 Weight Blend of Voranol TM 2120 and the Material Made in Example 7

The reaction setup is the same as used in Example 1. The kettle is heated to 55° C. in an oil bath and then charged with 10.49 g (0.0099 equivalents) of the material made in Example 7 and 39.88 g (0.2691 equivalents) of Isonate TM 143LM. The stirrer is then started and the kettle is placed under a vacuum of 0.5 mm Hg. Voranol TM 2120 (39.80 g, 0.0394 equivalents) is charged to the addition funnel through a syringe. The Voranol TM 2120 is then added dropwise to the kettle over a 45-minute period while the stirring and vacuum are maintained.

After a reaction time of approximately 3 hours, a standard HCl/di-n-butylamine titration is done to determine the prepolymer's equivalent weight. The prepolymer's equivalent weight is 413.21 g/equivalent with an NCO content of 10.16 weight percent.

EXAMPLE 25

Preparation of a Polymer Based on 1,4-Butanediol and the Prepolymer Made in Example 24

The reaction setup and equipment are used that were used in Example 24. 1,4-Butanediol (9.39 g, 0.2084 equivalents) is added to the prepolymer through the septum via a syringe. The mixture is stirred under vacuum for approximately 1.5 minutes. The vacuum is then broken and the contents of the kettle poured into a 4"×4"×0.125" steel window mold lined with mylar sheets. The mold is then closed and placed in a 150° C. oven for one hour after which it is removed and allowed to cool before being opened. The amount of 1,4-butanediol added is calculated to give a hard segment content of 50 weight percent. The Index is 1.04.

After being removed from the mold, the plaque is post-cured at 150° C. for one hour in a vacuum oven and cut apart for testing. Test results are given hereinbelow.

EXAMPLE 26

Preparation of an Isocyanate-Functional Prepolymer Comprised of Isonate=143LM and an 80/20 Weight Blend of Voranol TM 2120 and the Material Made in Example 4

The reaction setup is the same as used in Example 1. The kettle is heated to 55° C. in an oil bath and then charged with 10.15 g 0.0043 equivalents) of the material made in Example 4 and 40.09 g (0.2705 equivalents) of Isonate TM 143LM. The stirrer is then started and the kettle is placed under a vacuum of 0.5 mm Hg. Voranol TM 2120 (39.94 g, 0.0396 equivalents) is charged to the addition funnel through the septum via a syringe.

Voranol TM 2120 is then added dropwise to the kettle over a 45-minute period while the stirring and vacuum are maintained.

After a reaction time of approximately 3 hours, a standard HCl/di-n-butylamine titration is done to determine the prepolymer's equivalent weight. The prepolymer's equivalent weight is 407.08 g/equivalent with an NCO content of 10.29 weight percent.

EXAMPLE 27

Preparation of a Polymer Based on 1,4-Butanediol and the Prepolymer Made in Example 26

The reaction setup and equipment are used that were used in Example 26. 1,4-Butanediol (9.58 g, 0.2126 equivalents) is added to the prepolymer through the septum via a syringe. The mixture is stirred under vacuum for approximately one minute. The vacuum is then broken and the contents of the kettle poured into a 4"×4"×0.125" steel window mold lined with mylar sheets. The mold is then closed and placed in a 150° C. oven for one hour after which it is removed and allowed to cool before being opened. The amount of 1,4-butanediol added is calculated to give a hard segment content of 50 weight percent. The Index is 1.03.

After being removed from the mold, the plaque is post-cured at 150° C. for one hour in a vacuum oven and cut apart for testing. Test results are given hereinbelow.

EXAMPLE 28

Preparation of an Isocyanate-Functional Prepolymer Comprised of Isonate TM 143LM and an 70/30 Weight Blend of Voranol TM 2120 and the Material Made in Example 4

The reaction setup is the same as used in Example 1. The kettle is heated to 55° C. in an oil bath and then charged with 14.87 g (0.0125 equivalents) of the material made in Example 4 and 39.94 g (0.2695 equivalents) of Isonate TM 143LM. The stirrer is then started and the kettle is placed under a vacuum of 0.5 mm Hg. Voranol TM 2120 (35.82 g, 0.0355 equivalents) is charged to the addition funnel through the septum via a syringe. The Voranol TM 2120 is then added dropwise to the kettle over a 45-minute period while the stirring and vacuum are maintained.

After a reaction time of approximately 4 hours, a standard HCl/di-n-butylamine titration is done to determine the prepolymer's equivalent weight. The prepolymer's equivalent weight is 411.09 g/equivalent with an NCO content of 10.22 weight percent.

EXAMPLE 29

Preparation of a Polymer Based on 1,4-Butanediol and the Prepolymer Made in Example 28

The reaction setup and equipment are used that were used in Example 28. 1,4-Butanediol (9.59 g, 0.2186 equivalents) is added to the prepolymer through the septum via a syringe. The mixture is stirred under vacuum for approximately one minute. The vacuum is then broken and the contents of the kettle poured into a 4"×4"×0.125" steel window mold lined with mylar sheets. The mold is then closed and placed in a 150° C. oven for one hour after which it is removed and allowed to cool before being opened. The amount of 1,4-butanediol added is calculated to give a hard segment content of 50 weight percent. The Index is 1.03.

After being removed from the mold, the plaque is post-cured at 150° C. for one hour in a vacuum oven and cut apart for testing. Test results are given hereinbelow.

TABLE I

Physical Property Data for Comparative Example 2 and Examples 15, 17, 19, 21, 23, 25, 27 and 29

| Example | % Additive | Flexural Storage Modulus E' (Kpsi) | C.L.T.E ($\times 10^{-6}$/°C.) | Backbone of Additive |
|---|---|---|---|---|
| Comp. 2 | 0 | 16.92 | 206 | PPO |
| 15 | 10 | 17.76 | 199 | Urea |
| 17 | 20 | 21.55 | 200 | Urea |
| 19 | 30 | 50.23 | 202 | Urea |
| 21 | 30 | 28.86 | 168 | Amide |
| 23 | 20 | 20.20 | 198 | Urea |
| 25 | 20 | 22.87 | 176 | Amide/Urea |
| 27 | 20 | 28.53 | 174 | Biuret |
| 29 | 30 | 63.00 | 192 | Biuret |

Several observations can be made from Table I.

(1) By comparing Comparative Example 2 to Examples 15, 17 and 19 it can be seen that the modulus is increased as the amount of urea backbone additive is increased.

Example 15→105% of Comparative Example 2
Example 17→127% of Comparative Example 2
Example 19→297% of Comparative Example 2
There are only small changes in C.L.T.E.

(2) By comparing Comparative Example 2 to Example 21 it can be seen that the modulus is increased by 171 percent and a large improvement (decrease) is obtained in the C.L.T.E. by using an amide backbone additive.

(3) By comparing Comparative Example 2 to Example 25 it can be seen that the modulus is increased by 135 percent and a large improvement (decrease) is obtained in the C.L.T.E. by using an amide/urea mixed backbone additive.

(4) By comparing Comparative Example 2 to Examples 27 and 29 it can be seen that the modulus is increased and an improvement (decrease) is obtained in the C.L.T.E. by using a biuret backbone additive.

Example 27→169% of Comparative Example 2
Example 29→372% of Comparative Example 2

What is claimed is:

1. A polyahl comprising
   (1) a backbone having:
      (a) at least one acyclic moiety selected from the group consisting of biuret, thiourea, dithiobiuret, amide, and thioamide; and
      (b) at least two polyalkyleneoxy moieties: and
   (2) at least one terminal hydroxyalkyl carbamate group.

2. The polyahl of claim 1 wherein the hydroxyalkyl carbamate group is of the following formula:

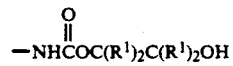

wherein $R^1$ is hydrogen, a $C_{1-6}$ alkyl, or an inertly-substituted $C_{1-6}$ alkyl.

3. The polyahl of claim 2 wherein $R^1$ is hydrogen, methyl, or ethyl.

4. The polyahl of claim 1 represented by the following formula:

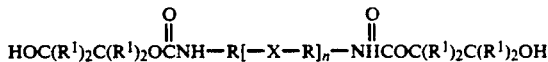

wherein $R^1$ independently in each occurrence is hydrogen, $C_{1-6}$ alkyl, or an inertly-substituted $C_{1-6}$ alkyl, R is independently in each occurrence an alkylene, cycloalkylene, aralkylene, aryl, alkyleneoxy, or polyalkyleneoxy moiety, wherein at least one R is a polyalkyleneoxy moiety: X is independently in each occurrence an acyclic moiety selected from the group consisting of biuret, thiourea, dithiobiuret, amide, and thioamide: and n is an integer between 1 and 50.

5. The polyahl of claim 4 wherein each $R^1$ is hydrogen or methyl.

6. The polyahl of claim 4 wherein each R is an alkyleneoxy or polyalkyleneoxy moiety.

7. The polyahl of claim 6 wherein each R is a polypropyleneoxy moiety.

8. The polyahl of claim 4 wherein X is a urea, amide, thiourea, or biuret moiety.

9. The polyahl of claim 4 wherein n is an integer between 2 and 10.

10. The polyahl of claim 1 represented by the following formula:

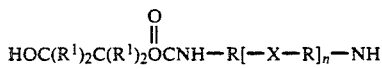

wherein $R^1$ independently in each occurrence is hydrogen, $C_{1-6}$ alkyl, or an inertly-substituted $C_{1-6}$ alkyl, R is independently in each occurrence an alkylene, cycloalaralkylene, aryl, alkyleneoxy, or polyalkyleneoxy moiety, wherein at least one R is polyalkyleneoxy: X is independently in each occurrence an acyclic moiety selected from the group consisting of biuret, thiourea, dithiobiuret, amide, and thioamide: and n is an integer between 1 and 50.

11. The polyahl of claim 10 wherein $R^1$ is hydrogen or methyl.

12. The polyahl of claim 10 wherein R is an alkyleneoxy or polyalkyleneoxy moiety.

13. The polyahl of claim 12 wherein R is a polypropyleneoxy moiety.

14. The polyahl of claim 10 wherein x is a urea, amide, thiourea, or biuret moiety.

15. The polyahl of claim 10 wherein n is an integer between 2 and 10.

16. The polyahl of claim 1 which contains from two to four hydroxyalkyl carbamate groups.

17. A process for preparing a polyahl containing urethane moieties which comprises contacting (A) a polyamine compound containing in its backbone at least one acyclic moiety selected from the group consisting of biuret, thiourea, dithiobiuret, amide, and thioamide wherein the amino groups are sufficiently spaced apart from each other that they do not undergo reaction with a single alkylene carbonate moiety to form a cyclic urea moiety, with (B) a cyclic alkylene carbonate, in amounts thereof and under conditions effective to form a hydroxyalkyl carbamate-containing polyahl comprising
  (1) a backbone having:
    (a) at least one acyclic moiety selected from the group consisting of biuret, thiourea, dithiobiuret, amide, and thioamide; and
    (b) at least two polyalkyleneoxy moieties; and
  (2) at least one terminal hydroxyalkyl carbamate group.

18. An isocyanate-functional prepolymer which comprises the reaction product of the polyahl of claim 1 with an excess over stoichiometry of isocyanates.

19. A urethane/urea polymer formed by the reaction of the isocyanate-functional prepolymer of claim 18 with at least one polyahl.

20. A urethane/urea polymer formed by the reaction of the polyahl of claim 1 with polyisocyanates, optionally in the presence of other polyahls.

* * * * *

UNITED STATES PATENT AND TRADEMARK OFFICE
CERTIFICATE OF CORRECTION

PATENT NO. : 5,115,070

DATED : May 19, 1992

INVENTOR(S) : Robert F. Harris, et al

Page 1 of 2

It is certified that error appears in the above-identified patent and that said Letters Patent is hereby corrected as shown below:

Front Page, Abstract, seventh line, delete " polyamide " and insert -- polyamine --.

Column 28, line 26, delete " moieties: " and insert -- moieties; --.

Column 28, line 52, delete " moiety: " and insert -- moiety; --.

Column 28, line 54, delete " thioamide: " and insert -- thioamide; --.

Column 29, lines 1 through 5, delete

"
$$HOC(R^1)_2C(R^1)_2OCNH - R[-X-R]_n - NH$$
"

with O above the C and insert

--
$$HOC(R^1)_2C(R^1)_2OCNH - R[-X-R]_n - NH$$
--.

with O double-bonded above the C

UNITED STATES PATENT AND TRADEMARK OFFICE
CERTIFICATE OF CORRECTION

PATENT NO. : 5,115,070

DATED : May 19, 1992

INVENTOR(S) : Robert F. Harris, et al

It is certified that error appears in the above-identified patent and that said Letters Patent is hereby corrected as shown below:

Column 29, lines 8 and 9, delete " cycloalaralkylene, " and insert -- cycloalkylene, --.

Column 29, line 10, delete " polyalkyleneoxy: " and insert -- polyalkyleneoxy; --.

Column 29, line 13, delete " thioamide: " and insert -- thioamide; --.

Column 30, line 12, delete " having: " and insert -- having; --.

Signed and Sealed this

Thirty-first Day of August, 1993

Attest:

BRUCE LEHMAN

Attesting Officer

Commissioner of Patents and Trademarks